UNITED STATES PATENT OFFICE.

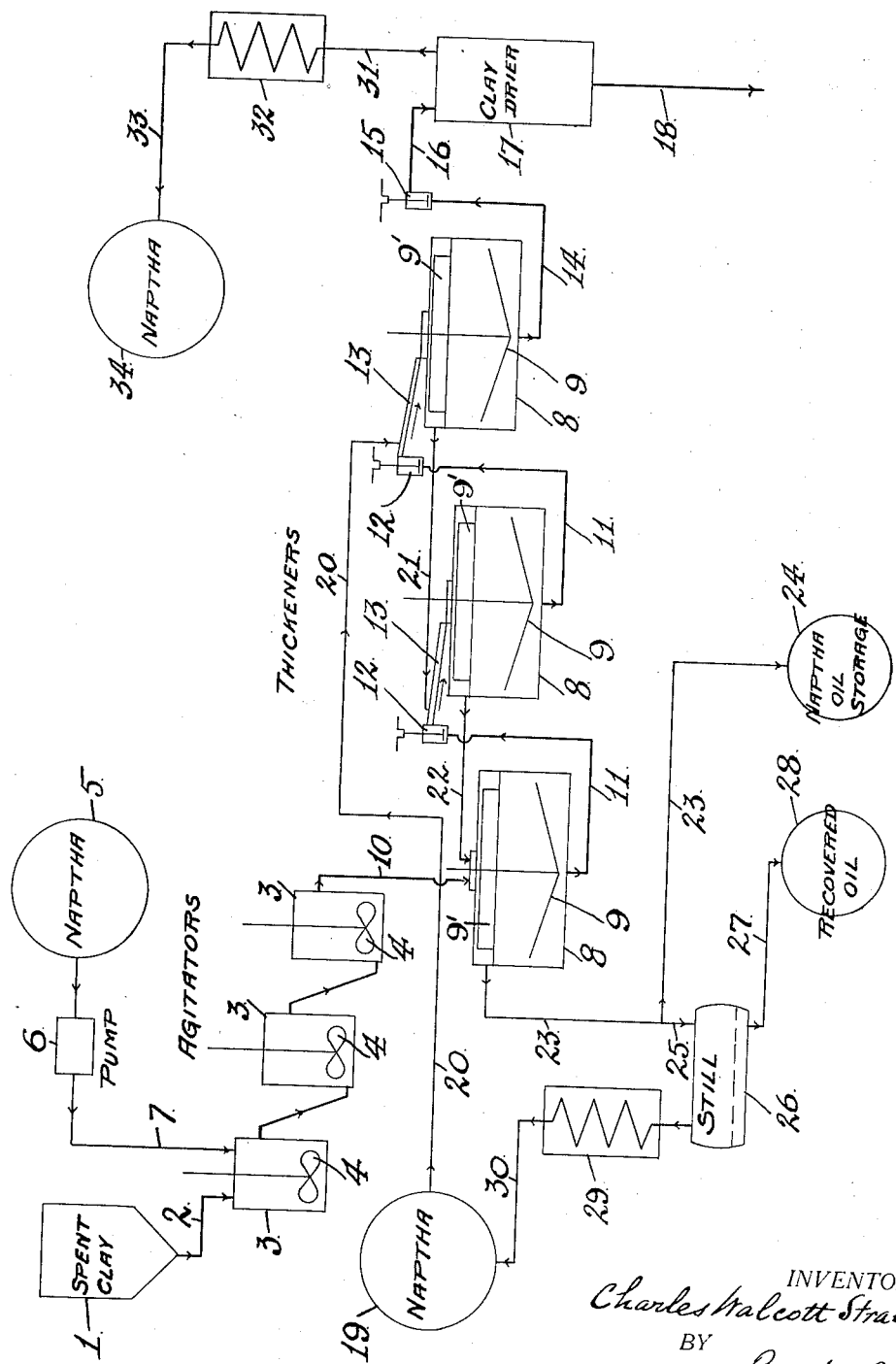

CHARLES WALCOTT STRATFORD, OF SAN FRANCISCO, CALIFORNIA.

METHOD OF RECOVERING CLAY USED IN BLEACHING PETROLEUM PRODUCTS.

1,408,656. Specification of Letters Patent. Patented Mar. 7, 1922.

Application filed March 21, 1921. Serial No. 454,211.

*To all whom it may concern:*

Be it known that I, CHARLES WALCOTT STRATFORD, a citizen of the United States, residing at the city and county of San Francisco and State of California, have invented certain new and useful Improvements in Methods of Recovering Clay Used in Bleaching Petroleum Products, of which the following is a specification.

My invention relates in general to the art of bleaching or decolorizing petroleum products, and particularly to those methods or processes which involve the use of argillaceous material or "bleaching" earths, serving as a filtering agent for removing from said products the color bearing compounds, to the degree demanded by the trade.

Fuller's earth, either a variety imported from England, or a domestic variety from Florida, known as Floridin fuller's earth, is usually employed. But comparatively recently a deposit of good bleaching earth has been found in Death Valley, California. While the chemical analysis of this Death Valley clay is practically equivalent to that of Floridin fuller's earth, its physical characteristics are quite different, in that it completely disintegrates when brought into contact with water, and, therefore, it can be used only in an extremely finely divided condition; and, also, it contains water-soluble and acid-soluble compounds which interfere with the bleaching effect, and which must be removed by treatment with sulfuric or other acid.

In an application, filed contemporaneously herewith, Serial Number 454,210, I have disclosed a method of preparing this Death Valley clay for use as the filtering agent in bleaching or decolorizing petroleum products; and in another application, also filed contemporaneously herewith, Serial Number 454,209, I have disclosed a method of bleaching or decolorizing said products with said prepared clay; and though my present invention, which consists in a novel method of recovering said prepared and used or spent clay, is not confined to the use of this particular earth, it is, in a sense, dependent upon the use of clay in a finely divided condition from which all deleterious substances have been removed; and I have found, in practice, that Death Valley clay is very suitable for my present method, in that its use affords a convenient, economical and practical continuous method of recovering said spent clay for regeneration and use again in bleaching petroleum products.

The nature of my invention will be fully described in and ascertained by the following specification, in connection with the accompanying drawing in which the figure is a diagrammatic view of an apparatus suitable for carrying out my method.

Referring to the drawing—1 indicates a bin for the spent clay to be treated and recovered. Its contents is delivered through a line 2 to the first of a connected series of digesters 3, in which 4 indicates the agitating or mixing elements. 5 is a tank to contain naphtha, and 6 is a pump by which, through the line 7, the naphtha is delivered to the first of the digesters 3.

7 is a series of thickeners, in which 9 indicates the mixing element and 9' the distributing element. The last of the series of digesters or agitators 3 is connected with the first of the thickeners 8 by a line 10.

Each thickener is connected with the one succeeding by a line 11 leading from its bottom, through a pump 12, which discharges into the cascade chute 13 delivering into the thickener.

From the bottom of the last thickener leads a line 14 to a pump 15 which discharges through a line 16 into a clay drier 17 from which a line 18 leads to any suitable destination of the recovered clay.

19 is a storage tank for washing naphtha. A line 20 leads from this tank to and discharges into the cascade chute 13 of the last thickener 8. From this thickener a line 21 leads back to and delivers into the cascade chute 13 of the preceding thickener, and from said last named thickener a line 22 leads back to and discharges into the first thickener. From the first thickener a line 23 leads either to a naphtha oil storage 24 or by a line 25 to a steam still 26. From this still the recovered oil is passed through a line 27 to a storage 28, while the distilled naphtha passes from the still through a condenser 29 and a line 30 to the washing naphtha storage 19.

From the top of the clay drier 17 leads a line 31 to a condenser 32 which by a line 33 delivers into a naphtha storage tank 34.

My method of recovering the spent clay, as carried out in this apparatus is as follows. The clay to be recovered, it is to be understood, is the spent clay after it has been used as a filtering agent in the bleaching of petroleum products. This spent clay, which contains some oil from its previous use, is passed in a continuous stream from the clay bin 1, through the line 2 into the first of the series of digesters 3. At the same time a stream of naphtha from the tank 5 is supplied by the pump 6, through line 7 to said first digester.

Through the connected series of digesters the clay with its oil content, and the naphtha are passed in a continuous stream and are thoroughly agitated and mixed. From the last digester the mixture is discharged through the line 10 into the first thickener 8, and it thence passes, gradually increasing in density as a slime, from one thickener to the next, as a continuous stream, through the connecting lines 11, pumps 12 and cascade chutes 13.

From the last thickener the slime flows through the line 14, pump 15 and line 16 into the clay drier 17. In this drier, whatever naphtha accompanies the clay is distilled off through the line 31, condenser 32, and line 33 into the storage 34. The dried clay is passed from the clay drier 17 through line 18 to whatever destination may be provided for the recovered clay.

A stream of washing naphtha from the storage 19 is passed through the line 20 and delivered into the cascade chute 13 of the last thickener 8. This washing naphtha flows counter-current to the flow of the slimes, passing from the last thickener through the line 21, to the cascade chute of the preceding thickener and from said thickener, through the line 22 to the first thickener. During this counter-current flow the washing naphtha increases in oil content; and from the first thickener the oil-naphtha solution flows through the line 23 either to the naphtha-oil storage 24 or by the line 25 to the steam still 26. In this still the naphtha is distilled off through condenser 29 back into the washing naphtha storage 19. The recovered spent clay may be heated again for its regeneration, after which it may be used once more for decolorizing oils.

All steps of my method conducted in the apparatus are continuous.

I claim:—

1. The method of recovering spent clay used in bleaching petroleum products which consists in passing a stream of spent clay and naphtha through a series of agitating means to mix them; passing a stream of said mixture through a series of thickening and washing means to reduce it to a slime; passing a stream of the slime to a drying means; and distilling off from the slime in drying, the naphtha content.

2. The method of recovering spent clay used in bleaching petroleum products which consists in passing a stream of spent clay and naphtha through a series of agitating means to mix them; passing a stream of said mixture through a series of thickening and washing means to reduce it to a slime; passing a stream of naphtha through the series of thickening means counter-current to the stream of said mixture therethrough to wash out the oil content thereof; passing a stream of the slime to a drying means; and distilling off from the slime in drying, the naphtha content.

3. The method of recovering spent clay used in bleaching petroleum products which consists in passing a stream of spent clay and naphtha through a series of agitating means to mix them; passing a stream of said mixture through a series of thickening and washing means to reduce it to a slime; passing a stream of naphtha through the series of thickening means counter-current to the stream of said mixture therethrough, to wash out the oil content thereof; distilling the naphtha from said stream of oil and naphtha solution for use again; passing a stream of the slime from the thickening means to a drying means; and distilling off from the slime in drying, the naphtha content.

In testimony whereof I have signed my name to this specification.

CHARLES WALCOTT STRATFORD.